(12) United States Patent
Mann et al.

(10) Patent No.: US 6,757,610 B1
(45) Date of Patent: Jun. 29, 2004

(54) METHOD FOR RAPID LOCATION DETERMINATION USING PARAMETRIC VALUES OBTAINED IN A PREVIOUS LOCATION DETERMINATION

(75) Inventors: Wallace Mann, Mill Valley, CA (US); Jesse Stone, Palo Alto, CA (US)

(73) Assignee: SiRF Technology, Inc., San Jose, CA (US)

(*) Notice: Subject to any disclaimer, the term of this patent is extended or adjusted under 35 U.S.C. 154(b) by 87 days.

(21) Appl. No.: 10/068,187

(22) Filed: Feb. 4, 2002

(51) Int. Cl.[7] ............................................. G06C 21/00
(52) U.S. Cl. ........................................ 701/213; 701/200
(58) Field of Search ................................ 701/200, 201, 701/213, 214; 340/988; 342/357.01, 357.13

(56) References Cited

U.S. PATENT DOCUMENTS 6,559,894 B2 * 5/2003 Omura et al. ............... 348/614

2002/0196178 A1 * 12/2002 Beard ........................ 342/42

* cited by examiner

*Primary Examiner*—Yonel Beaulieu
(74) *Attorney, Agent, or Firm*—Edward C. Kwok; MacPherson Kwok Chen & Heid LLP

(57) ABSTRACT

A method for providing an initial estimate for an interval of possible values for a parameter used in an acquisition of a signal maintains parameter values obtained from previous signal acquisitions and the times at which the signal acquisitions were made. The maintained values of the parameter are used to derive a candidate value for the parameter to be used in a new signal acquisition. To make the maintained values available even after a brief period during which the GPS receiver is powered down, the maintained values can be stored in a non-volatile memory. The signal acquisitions may correspond to GPS satellite signal acquisitions, and the maintained parameter values can be grouped according to whether a successful receiver location determination was accomplished.

12 Claims, 4 Drawing Sheets

METHOD FOR RAPID LOCATION DETERMINATION USING PARAMETRIC VALUES OBTAINED IN A PREVIOUS LOCATION DETERMINATION

FIELD OF THE INVENTION

The present invention relates generally to signal processing. In particular, the present invention relates to location determination under the Global Positioning System (GPS) using parameter values obtained from a previous location determination.

DISCUSSION OF THE RELATED ARTS

Location determination using GPS is achieved in a receiver by processing signals received from multiple GPS satellites. The time difference between signal transmission at a GPS satellite and the same signal being received at the receiver provides a range measurement ("pseudoranges") representative of the distance between the satellite and the receiver. To allow the signal of each GPS satellite to be distinguished from the signals of other GPS satellites, each GPS satellite modulates the carrier signal (1575.42 MHz) with a 1024-chip pseudo-random code (PRN) assigned to that GPS satellite. The PRN has a 1-millisecond period. In theory, the PRNs of the GPS satellites are mutually orthogonal to allow them to be individually recovered at the receiver. Because the position of each satellite at signal transmission time is relatively accurately known, the position of the receiver can be determined in theory using four or more pseudoranges from multiple GPS satellites.

The time difference between signal transmission and the signal reaching the receiver is often represented by the quantity "code phase," which is equal to the time difference modulo the period of the PRN. To obtain a pseudorange, the receiver processes the signal received, taking into consideration signal and receiver parameters, some of which values are not accurately known a priori. For example, the motion of the satellite relative to the receiver (a signal parameter) and the imperfection in the receiver clock (a receiver parameter) lead to frequency shifts ("Doppler effects") in the received signal, known respectively as "satellite Doppler" and "clock Doppler." The receiver's own motion also contributes a Doppler effect in the received signal. Other Doppler effects also exist. For example, a Doppler like effect is introduced when the receiver processes the received signal at an intermediate frequency between the GPS carrier and the base-band frequency. Another Doppler-like effect is introduced by the condition of Earth's atmosphere. Signal processing is further complicated by the low bit-rate signal which modulates navigational data onto the GPS satellite signal. The navigational data includes the satellite's ephemeris data, for example, which are used in many systems to aid acquisition of the GPS satellite signal.

In summary, even in ideal conditions, location determination under GPS requires significant signal processing power. Under a less than ideal condition (e.g., weak signal or multipath effects), the signal processing time required to "acquire" a location is significant. Thus, methods or techniques that can reduce the signal processing time are desirable.

SUMMARY OF THE INVENTION

According to the present invention, a method for providing an initial estimate of an interval representing possible values of a parameter used in acquiring a signal is provided. In that method, the parameter values obtained from previous signal acquisitions and the times at which the signal acquisitions were made are maintained for use in subsequent signal acquisitions. In one embodiment, the maintained parameter values are used to derive a candidate value for that parameter, or another parameter, to be used in a new signal acquisition. To make the maintained values available even after a brief period of power interruption in the receiver, the maintained values can be stored in a non-volatile memory.

In one embodiment, the signal acquisitions correspond to GPS satellite signal acquisitions, and the maintained parameter values are grouped according to whether a successful receiver location determination was accomplished.

The parameters suitable for this method include spatio-temporal parameters, kinematic parameters and other parameters suitable for limiting the search spaces used, or to enhance the level of sensitivity, in a signal acquisition. One example of such a parameter is the clock Doppler, which can be used to limit the carrier frequency search space, or to increase sensitivity, in a GPS satellite signal acquisition. Alternatively, the parameter can be one determined from other parameter values maintained. One example of such a derived parameter is the minimum receiver velocity magnitude.

In one embodiment, the candidate parameter value is then assigned an interval appropriate for the elapsed time since the signal acquisition times associated with the maintained parameter values used to derive the candidate value. Typically, based on the assumption that parameter values change gradually over time, the more recent the maintained values, the tighter the interval can be made. The assigned interval can then be used as an initial estimate to limit the search space or spaces for the next signal acquisition, or to focus the beginning of the search. That is, the information is applicable not only for limiting the search boundary, it can also be used to determine the initial conditions of the search. The suitable interval to be assigned can be determined from empirical data, and known physical or other constraints can be used to limit its range.

Of course, the use of an interval is merely one useful format for expressing a range of parameter values. Other means for expressing parameter values or applications of such parameter values exist. For example, rather than providing an interval or a set of parameter values, one or more constraints on one or more parameters can be output as a result of analyzing parameter values from previous signal acquisitions.

Using data from previous signal acquisitions, the search space associated with the signal processing can be substantially limited, thereby significantly speeding up or increasing the sensitivity, of the signal acquisition process.

The present invention is better understood upon consideration of the detailed description below and the accompanying drawings.

BRIEF DESCRIPTION OF THE DRAWINGS

To facilitate cross-reference among the figures and to simplify the detailed description, like elements in the figures are provided like reference numerals.

DETAILED DESCRIPTION OF THE PREFERRED EMBODIMENTS

To minimize processing time in a signal processing task, such as a location determination under GPS, the present invention provides a method in which a previously determined parameter value—after being suitably adjusted for the time elapsed since the parameter value was determined—is used in a new signal processing task.

The present invention is illustrated by an application in the context of a receiver location determination under GPS. According to one embodiment, location determination is accomplished using a GPS receiver that typically includes a conventional digital signal processor that is supported by volatile and non-volatile memory elements. To prepare the received signal for digital signal processing, the received signal is suitably amplified, filtered, down-converted from the GPS carrier frequency (nominally at 1575.42 MHz) to a signal of an intermediate frequency $f_{IF}$ and digitized. In the remainder of this detailed description, this digitized signal is referred to as the "received signal."

Figure 1:
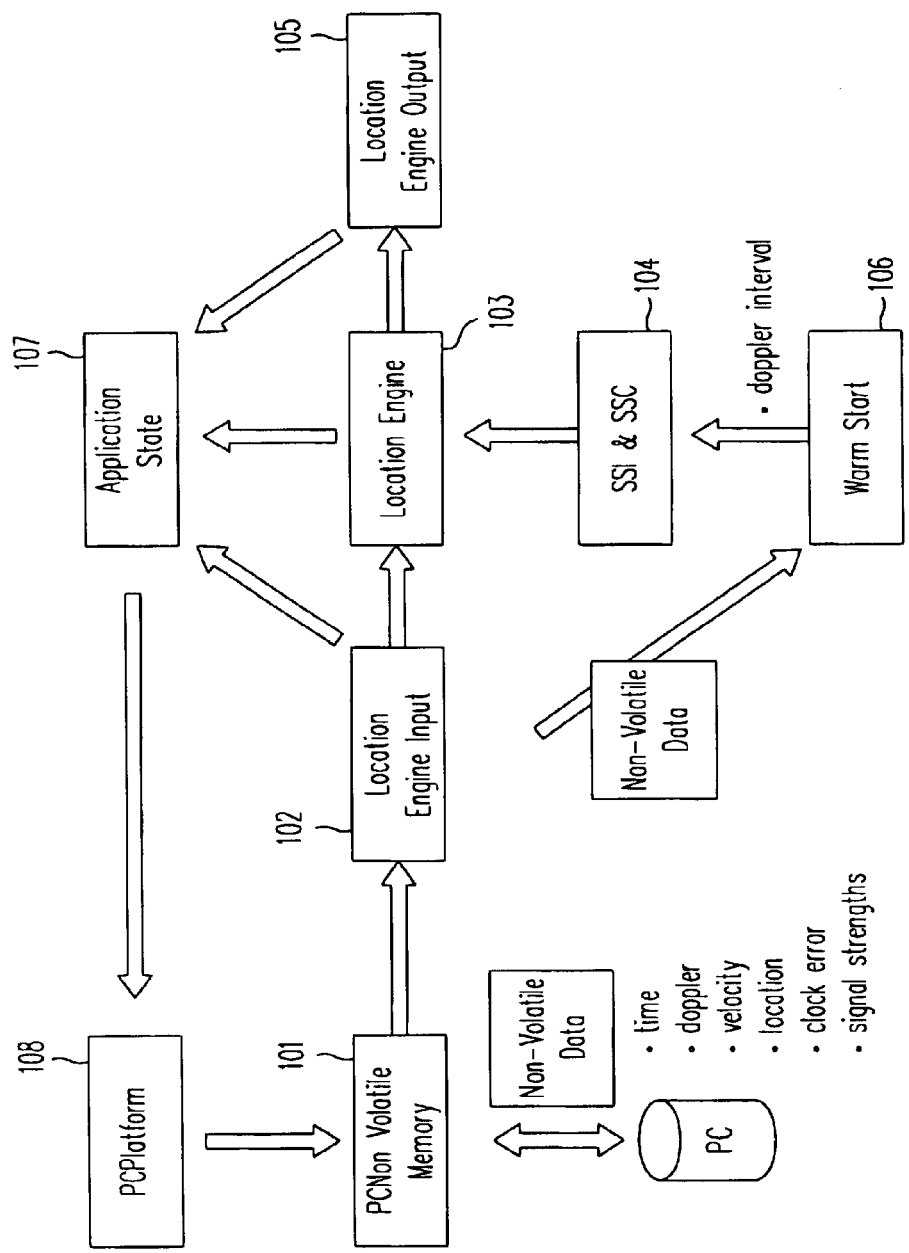
FIG. 1 illustrates the data flow in a location determination apparatus 100 under GPS, in accordance with one embodiment of the present invention.

FIG. 1 illustrates the data flow in a location determination apparatus 100, in accordance with one embodiment of the present invention. Location apparatus 100 can be implemented, for example, on a platform based on the "PC" architecture, which is well known to those skilled in the art. As shown in FIG. 1, location determination apparatus 100 includes (a) non-volatile memory module 101 for managing a non-volatile memory, (b) location engine input module 102 for managing input data to location engine module 103 (e.g., the received signal, initial parameter values, etc.), (c) satellite search information and constraint (SSI & SSC) module 104 for managing information relevant to acquisition of the GPS satellite signals and parameters value intervals and constraints used by location engine 103 for acquiring a GPS satellite signal, (d) location engine module 103 for performing the receiver location determination, (e) location engine output module 105 for providing and formatting output data associated with the receiver location determination, (f) warm start module 106 providing initial parameter values based on previous determinations, (g) application state module 107 for maintaining the operational states of location determination apparatus 100, and (h) platform module 108 that controls operations of location determination apparatus 100.

In this embodiment, location engine 103 determines the receiver location by searching within a region centered at an approximate location. One such method for determining the receiver location is described in co-pending U.S. patent application ("Copending Application I"), Ser. No. 09/782,648, entitled "Location-Determination Method and Apparatus," filed on Feb. 12, 2001 assigned to Enuvis, Inc., which is also the Assignee of the present application. The disclosure of Copending Application I is hereby incorporated herein by reference in its entirety. In that method of Co-pending Application I, a receiver location provides a significant value (e.g., a maximum, or a value exceeding a predetermined threshold value) in a joint maximum likelihood function when that location is likely to yield the measured estimated code-phase and measured frequency shift. The estimated frequency shift is a deviation from the intermediate frequency $f_{IF}$ of the acquired satellite signals. (In this embodiment, a GPS satellite signal is "acquired" when an estimated code phase and an estimated carrier frequency shift are determined for that GPS satellite signal). As described in Copending Application I, the joint maximum likelihood function is derived from maximum likelihood functions of individual GPS satellite signals, which take into consideration multi-path effects. One method for including multipath effects in an estimation of receiver location is described in provisional patent application ("Provisional Application I"), Ser. No. 60/318,216, entitled "Estimation of Receiver Location and Other Parameters in Multipath Environments," filed on Sep. 7, 2001, also assigned to Enuvis, Inc. The disclosure of Provisional Application I is hereby incorporated herein by reference in its entirety.

In this embodiment, location engine 103 estimates the code phase and the carrier frequency shift for each GPS satellite by searching for the code phase and carrier frequency shift pair from a 3-dimensional grid that result in a significant magnitude (e.g., maximum, or a value exceeding a threshold value) for a correlation function. The correlation function can be, for example, a complex-valued function that correlates the received signal to a shifted replica of the PRN. One such complex-value function is the conventional In Phase ("I") and Quadrature ("Q") integrals, known to those skilled in the art. The computational power required to compute the correlation function for all the GPS satellites that are within the line-of-sight and for all possible code phases and all possible frequency shifts is prohibitive. Therefore, many techniques are applied to reduce the computational requirements.

A general framework for accurately capturing multiple GPS satellite signals efficiently is described in U.S. patent application ("co-pending Application II"), Ser. No. 09/888,229, entitled "Determining Location Information using Sampled Data Containing Location Determining Signals and Noise," filed on Jun. 22, 2001, also assigned to Enuvis, Inc. The disclosure of Co-pending Application II is hereby incorporated herein by reference in its entirety. Under that general framework, an initial search of the code phase and the carrier frequency spaces for each GPS satellite is facilitated by computing coherent correlation sums, such as described in U.S. patent application (Co-pending Application III), Ser. No. 09/888,227, entitled "Synthesizing Coherent Correlation Sums at one or Multiple Carrier Frequencies using Correlation Sums calculated at a Coarse Set of Frequencies," filed on Jun. 22, 2001, also assigned to Enuvis, Inc. In the computation of the correlation sums, the values of the data bits in the navigational data can be used effectively to provide greater accuracy, as described in U.S. patent application ("Co-pending Application IV"), Ser. No, 09/888,228, also assigned to Enuvis, Inc. The disclosures of Co-pending Applications III and IV are hereby incorporated herein by reference in their entireties.

Many variations in techniques can be used to speed up the initial search. For example, one technique, called "ultrastacking," divides the modulated received signal (i.e., the received signal modulated by the estimated carrier frequency) into 1 ms "chunks," compensates each chunk for misalignment due to the Doppler frequency shifts, sums the chunks to form a "stacked" signal, and integrates this stacked signal with the satellite PRN code over 1 ms for each selected code phase. One implementation of ultrastacking is described in the provisional patent application ("Provisional Application II"), Ser. No. 60/315,538, entitled "Ultrastacking Refinement, Frequency-following probes, submillisecond Chunking, and Mixed References for Position Determination," filed on Sep. 8, 2001, also assigned to Enuvis, Inc. The disclosure of Provisional Application II is hereby incorporated herein by reference in its entirety.

After completing coarse signal search, the initial search can then be further refined to accurately estimate the code phase and the carrier frequency using, for example, a band-limited interpolation or a template-based interpolation technique. One example of the refined search is described in U.S. patent application ("Copending Application V"), Ser. No. 09/888,338, entitled "Extracting Fine-tuned Estimates from Correlation Functions Evaluated at Limited Number of Values," filed on Jun. 22, 2001. The disclosure of Co-pending Application V is hereby incorporated herein by reference in its entirety.

As each GPS satellite signal is acquired, uncertainties in parameter values common across the GPS satellite signals diminish. The diminished uncertainties can be used to limit the search space in acquisition of subsequent satellite signals. One example of such a parameter is the "clock Doppler," which is a receiver parameter including effects from the mismatch between the clock used in the GPS satellites and the local clock at the receiver. Maintaining and updating the parameter values are carried out in SSI & SSC module 104 mentioned above. One method to update and refine parameter values and their uncertainties, which uses linear programming techniques, is described in U.S. patent application ("Co-pending Application VI"), Ser. No. 09/888,229, entitled "Determining the Spatio-Temporal and Kinematic Parameters of a Signal Receiver and its Clock by Information Fusion," filed on Jun. 22, 2001, also assigned to Enuvis, Inc. The disclosure of Co-pending Application VI is hereby incorporated herein by reference in its entirety.

In this embodiment, for each GPS satellite signal acquisition, parameter values associated with the GPS satellite signal acquisition are stored in the non-volatile memory for use in a subsequent "warm start." If the receiver location is successfully acquired, the parameter values of the GPS satellite signals associated with that location acquisition are merged into a record of the location acquisition and stored also in the non-volatile memory. The parameter values stored in the non-volatile memory ("non-volatile data") can include (a) acquisition time, (b) satellite Doppler, (c) clock Doppler, (d) receiver velocity, (e) receiver location, (f) clock error and (g) signal strength. Of course, the parameter values stored in this embodiment is by no means exhaustive, any other relevant parameter value can also be stored.

In one implementation, non-volatile memory module 101 provides functions add( ), getAcquired( ) and getAny( ) to add record of the non-volatile data to be added to the non-volatile memory, to get a non-volatile data record associated with a previously acquired location, and to get a non-volatile data record associated with a GPS satellite signal acquisition not resulting in a location acquisition. Referring back to FIG. 1, for example, the add( ) routine can be called by platform module 108 to add records, and the getAcquired( ) and getAny( ) functions can be called by location engine input module 102 to retrieve the corresponding information. In turn, in that implementation, location engine input module 102 maintains acquiredQueue( ) and anyQueue( ) functions to maintain a collection of non-volatile data records for previously acquired locations, and a collection of non-volatile data records of previous GPS satellite signal acquisitions. These collections, representing a first-in-first-out or queue data structure in this embodiment, can be stored in the non-volatile memory along with other input information (e.g., the GPS signal) when location determine apparatus 100 enters into a power-savings mode or is shut off, and read back into location engine input module 102 when operation is resumed.

The acquiredQueue( ) and anyQueue( ) functions can be used, for example, by warm start module 106 to retrieve parameter values associated with previous acquisitions of a receiver location or a GPS satellite signal. For example, warm start module 106 provides, in one implementation, a getClockDopplerInterval( ) function that provides an estimated interval of possible clock Dopplers for the next location acquisition based on previously acquired receiver locations or GPS satellite signals not resulting in a receiver location determination, and the elapsed times since the receiver location or GPS satellite signal acquisitions. GetClockDopplerInterval( ) can be called, for example, by SSI and SSC module 104 to provide parameter values to initialize the carrier frequency search space used by location engine module 103.

Figure 2:
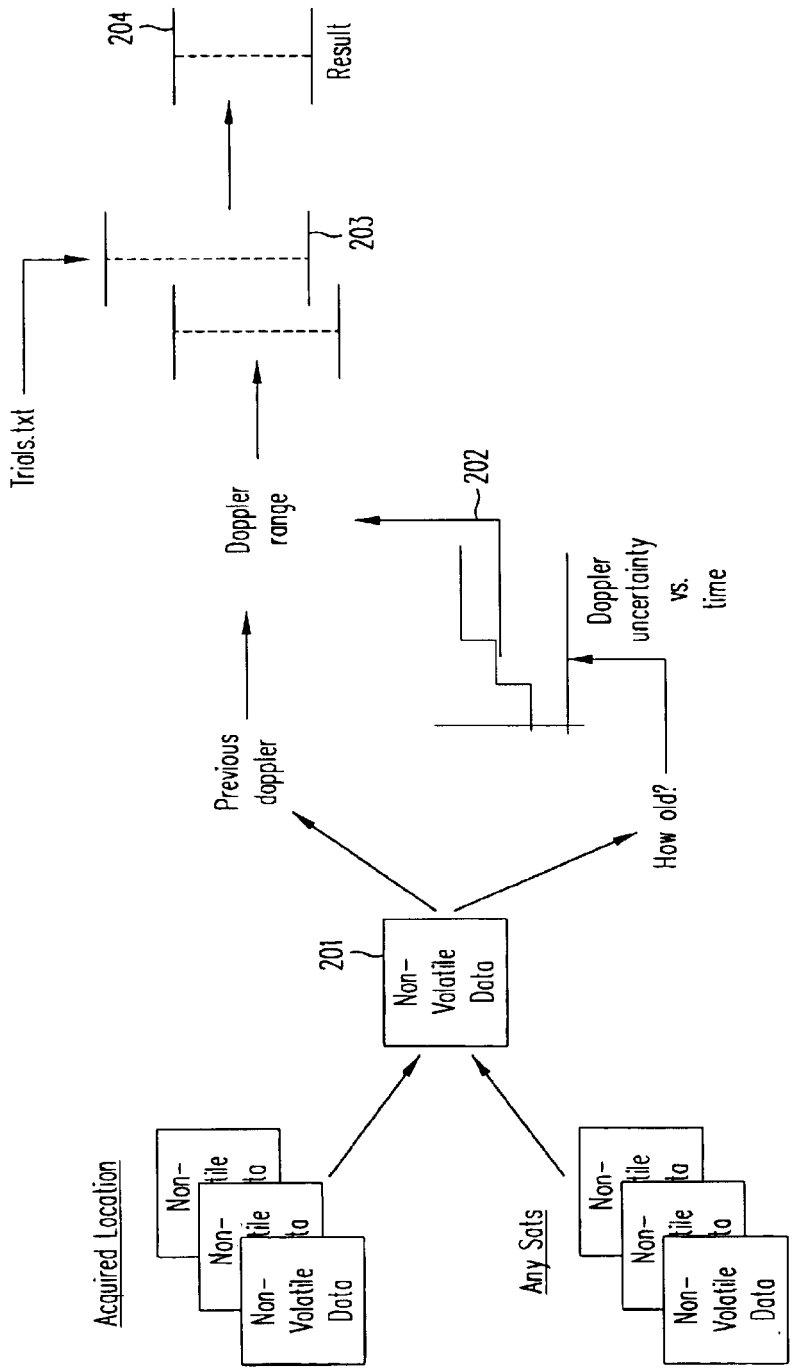
FIG. 2 illustrates one implementation of a getClockDopplerInterval( ) function, according to one embodiment of the present invention.

One implementation of getClockDopplerInterval( ) is illustrated by FIG. 2. As shown in FIG. 2, at step 201, warm start module 106 selects a clock Doppler value from the non-volatile data records associated with a recently acquired receiver location. If such a record is not available, warm start module 106 may select from a recently acquired GPS satellite signal acquisition that did not result in a receiver location determination. At step 202, warm start module 106 provides an uncertainty interval to the clock Doppler value according to how recently the associated acquisition was made. The appropriate interval adjustment to use can be empirically determined. Generally, a smaller interval is assigned to more recently acquired clock Doppler value. The assigned interval is then compared, at step 203, to a maximum interval for the receiver, which can also be an empirically determined value. Step 204 shows that the overlap between the assigned interval and the maximum interval is provided as output from the getClockDopplerInterval( ) function.

Of course, the use of an interval is merely one useful format for expressing a range of parameter values. Other ways for expressing parameter values or applications of such parameter values exist. For example, rather than providing an interval or a set of parameter values, one or more constraints on one or more parameters can be output as a result of analyzing parameter values from previous signal acquisitions. These and other formats for expressing parameter values are contemplated to be within the scope of the present invention.

Figure 3:
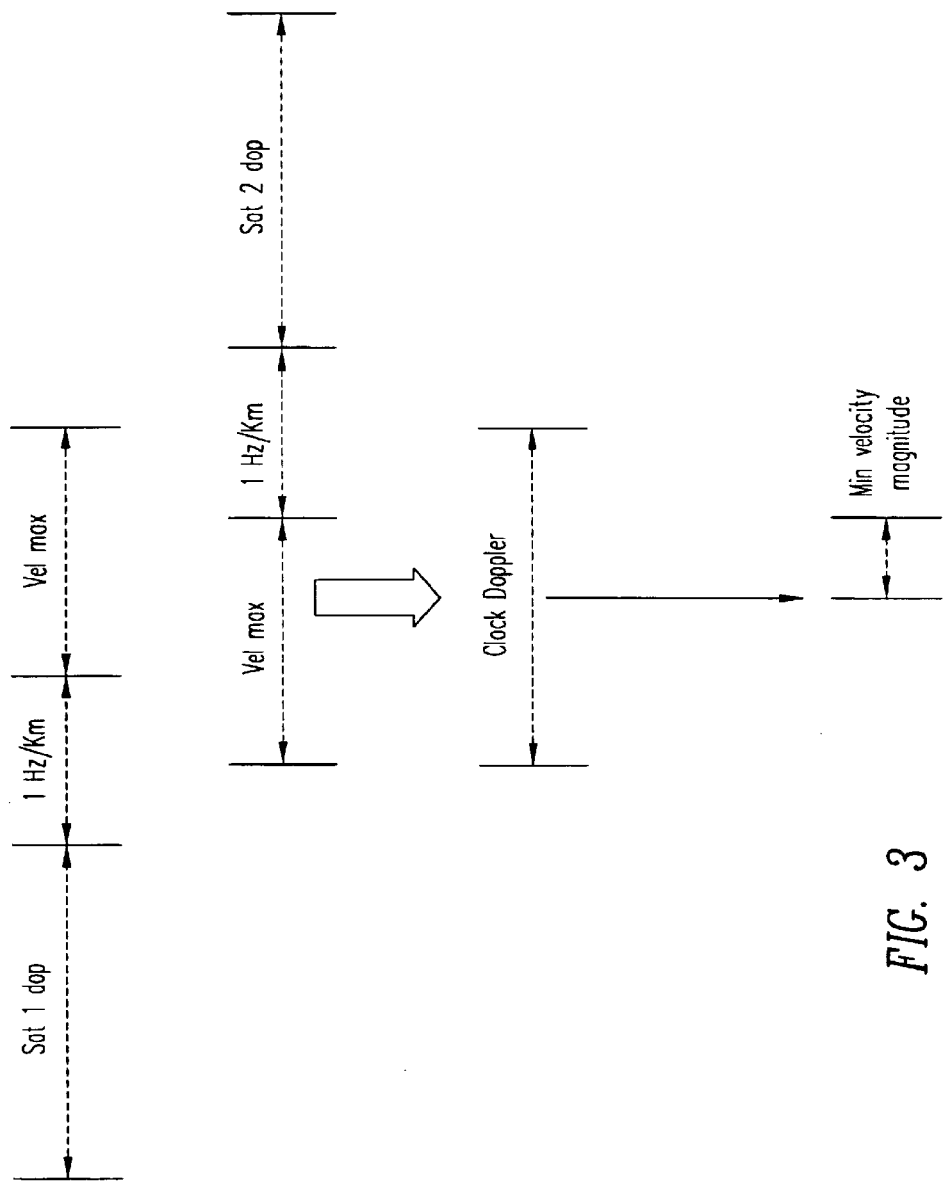
FIG. 3 illustrates one method to obtain an estimate of a minimum receiver velocity interval, in accordance with one embodiment of the present invention.

Another example that can be implemented in warm start module 106 is an estimate of a constraint or interval for the receiver velocity. In one embodiment, the clock Doppler is constrained by the cumulative intervals of the satellite Doppler, an uncertainty relating to using an approximate location in the search process, and the receiver velocity. In that embodiment, the approximate location can be obtained by reference to a cellular communication infrastructure. The resulting error, expressed as a Doppler effect on the received signal, is within 1 Hz per kilometer of cell radius (i.e., 5 Hz if the cell covers a radius of 5 kilometers). Since the clock Doppler is substantially common across all GPS satellite signal acquisitions, when two or more GPS satellite signals are acquired, a refinement to the error estimate in the clock Doppler interval can be estimated by the overlap of the cumulative intervals associated with the GPS satellite signal acquisitions. If this refined clock Doppler interval is located in the middle of the clock Doppler intervals of two most extreme GPS satellite signals simultaneously acquired, a minimum receiver velocity interval can be estimated. FIG. 3 illustrates how such a minimum receiver velocity interval can be estimated.

Figure 4:
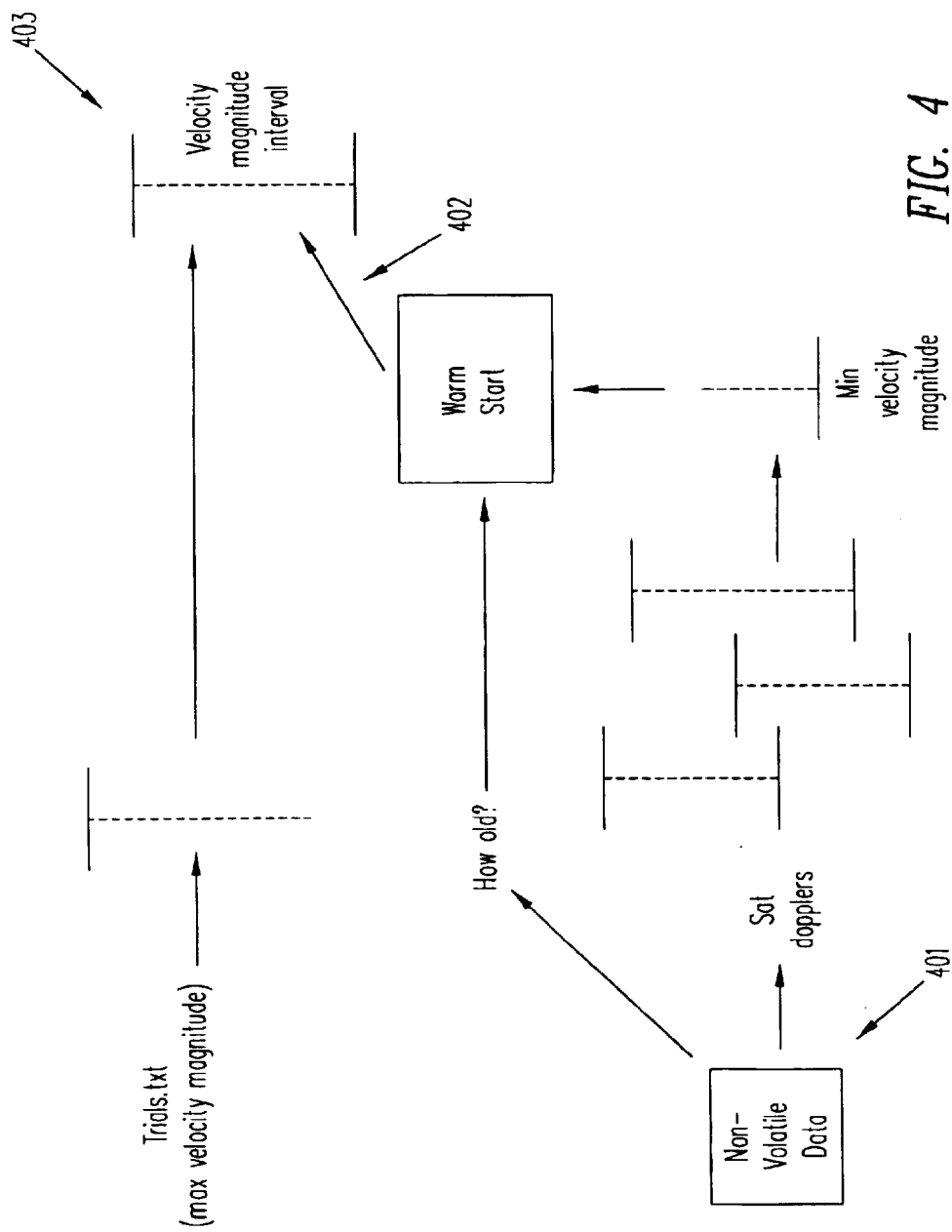
FIG. 4 illustrates one implementation of a velocity magnitude interval estimate in warm start module 106, in accordance with the present invention.

FIG. 4 illustrates one implementation of a velocity magnitude interval estimate in warm start module 106. As shown in FIG. 4, at step 401, warm start module 106 selects clock Doppler intervals from the non-volatile data records associated with a recently acquired receiver location, or recently acquired GPS satellite signal acquisitions, to derive a minimum velocity magnitude interval. At step 402, warm start module 106 provides an aged uncertainty interval to the minimum velocity magnitude interval estimate according to how recently the associated acquisitions were made. The appropriate adjustment to the minimum velocity magnitude interval estimate can be determined empirically. Generally, a smaller interval adjustment is assigned when the GPS satellite acquisitions are more recent. The assigned interval is then compared, at step 403, to known interval limits, which can also be empirically determined. This minimum velocity magnitude interval can then be used as an initial constraint on the carrier frequency search space.

The above detailed description is provided to illustrate specific embodiments of the present invention and is not intended to be limiting. Numerous variations and modifications within the scope of the present invention are possible. The present invention is set forth in the following claims.

We claim:

1. A method for providing an initial estimate for an interval of possible values for a parameter used in an acquisition of a signal, comprising:

maintaining values of parameters associated with one or more previous signal acquisitions and signal acquisition times at which said signal acquisitions were made;

deriving from said maintained values of said parameter a candidate value for said parameter to be used in a new signal acquisition;

selecting for said candidate value a constraint on said candidate value; and providing said selected constraint as said initial estimate.

2. A method as in claim 1, wherein said parameter is a spatio-temporal parameter.

3. A method as in claim 1, wherein said parameter is a kinematic parameter.

4. A method as in claim 1, wherein said parameter comprises a clock doppler value used in a GPS satellite signal acquisition.

5. A method as in claim 1, wherein said parameter comprises a minimum receiver velocity magnitude used in a GPS satellite signal acquisition.

6. A method as in claim 1, wherein said previous signal acquisitions are GPS satellite signal acquisitions, and wherein said maintained values are grouped according to whether a successful receiver location determination was accomplished.

7. A method as in claim 1, wherein said constraint is determined from empirical data.

8. A method as in claim 1, further comprising adjusting said selected constraints to predetermined limits for said candidate value.

9. A method as in claim 1, wherein said maintained values of said parameters are stored in a non-volatile memory.

10. A method as in claim 1, wherein said constraint comprises an interval.

11. A method as in claim 1, wherein said constraint applies to multiple parameter values.

12. A method as in claim 1, wherein said constraint is related to said signal acquisition times.

* * * * *